United States Patent
Hirota et al.

(10) Patent No.: US 6,342,318 B1
(45) Date of Patent: Jan. 29, 2002

(54) HYDROGEN ABSORBING ALLOY ELECTRODE AND PROCESS FOR PRODUCING SAME

(75) Inventors: Yohei Hirota, Itano-gun; Nobuyuki Higashiyama, Ikeda; Teruhiko Imoto, Itano-gun; Kikuko Kato, Katano; Mamoru Kimoto, Hirakata; Shin Fujitani, Hirakata; Koji Nishio, Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/460,426

(22) Filed: Dec. 14, 1999

(30) Foreign Application Priority Data

Dec. 16, 1998 (JP) ............................................ 10-357202

(51) Int. Cl.⁷ .............................. H01M 4/58; C01B 6/24
(52) U.S. Cl. .................. 429/218.2; 429/218.1; 429/223; 429/231.95; 420/900
(58) Field of Search ........................... 429/218.2, 218.1, 429/223, 231.5; 420/900

(56) References Cited

U.S. PATENT DOCUMENTS 6,106,769 A * 8/2000 Shinya et al. ............... 420/900
6,200,705 B1 * 3/2001 Hayashida et al. ......... 429/218.2

FOREIGN PATENT DOCUMENTS

| JP | 6-215765 | 8/1994 |
| JP | 8-222210 | 8/1996 |
| JP | 8-287946 | 11/1996 |

* cited by examiner

*Primary Examiner*—Carol Chaney
*Assistant Examiner*—Angela J. Martin
(74) *Attorney, Agent, or Firm*—Armstrong, Westerman, Hattori, McLeland & Naughton, LLP

(57) ABSTRACT

A hydrogen absorbing alloy electrode is provided which has an excellent oxygen gas absorbing capacity and further improved in charge-discharge cycle characteristics and high-rate discharge characteristics. The electrode contains a powder prepared by mixing a hydrogen absorbing alloy powder with a powder of at least one complex oxide selected from the group consisting of a $ZrO_2$—$Y_2O_3$ solid solution, $ZrO_2$—$CaO$ solid solution, $CeO_2$—$Gd_2O_3$ solid solution, $CeO_2$—$La_2O_3$ solid solution, $ThO_2$—$Y_2O_3$ solid solution, $Bi_2O_3$—$Y_2O_3$ solid solution, $Bi_2O_3$—$Gd_2O_3$ solid solution, $Bi_2O_3$—$Nb_2O_3$ solid solution and $Bi_2O_3$—$WO_3$ solid solution. Preferably the electrode contains 0.1 to 10 wt. % of the complex oxide powder based on the combined amount of the two powders.

10 Claims, No Drawings

HYDROGEN ABSORBING ALLOY ELECTRODE AND PROCESS FOR PRODUCING SAME

FIELD OF THE INVENTION

The present invention relates to hydrogen absorbing alloy electrodes for use as negative electrodes in nickel-hydrogen cells or batteries.

BACKGROUND OF THE INVENTION

Nickel-hydrogen cells are available which comprise a negative electrode prepared from a hydrogen absorbing alloy which reversibly absorbs or desorbs hydrogen.

Nickel-hydrogen cells are known as cells having a high capacity, giving a high output and also high in energy density per unit volume and per unit weight.

With the nickel-hydrogen cell, the oxygen gas evolved from the positive electrode during overcharging is consumed by the hydrogen absorbing alloy of the negative electrode. However, when the negative electrode becomes unable to fully consume the oxygen gas owing, for example, to the deterioration of the hydrogen absorbing alloy, the oxygen gas produced is like to increase the internal pressure of the cell or oxidize the hydrogen absorbing alloy.

Accordingly, JP-A No. 287946/1996 discloses an alkali cell comprising a hydrogen absorbing alloy electrode having zirconium oxide added thereto. The zirconium oxide added to the negative electrode improves the gas absorbing performance during overcharging to inhibit the oxidation of the negative electrode. With the oxidation of the negative electrode inhibited, the cell is given increased charge-discharge cycles.

An object of the present invention is to provide a hydrogen absorbing alloy electrode which exhibits a high oxygen gas absorbing capacity during overcharging and which is further improved in charge-discharge cycle characteristics and high-rate discharge characteristics.

SUMMARY OF THE INVENTION

To fulfill the above object, the present invention provides a hydrogen absorbing alloy electrode which is prepared from a powder obtained by mixing a hydrogen absorbing alloy powder with a power of at least one complex oxide (It may be called as a double oxide.) selected from the following group.

The group of complex oxides consists of a $ZrO_2$—$Y_2O_3$ solid solution, $ZrO_2$—$CaO$ solid solution, $CeO_2$—$Gd_2O_3$ solid solution, $CeO_2$—$La_2O_3$ solid solution, $ThO_2$—$Y_2O_3$ solid solution, $Bi_2O_3$—$Y_2O_3$ solid solution, $Bi_2O_3$—$Gd_2O_3$ solid solution, $Bi_2O_3$—$Nb_2O_3$ solid solution and $Bi_2O_3$—$WO_3$ solid solution.

The complex oxides mentioned above are all oxide ion conductors and have many oxygen defects in its crystal structure.

Accordingly, an excess of oxygen gas evolved by the positive electrode during overcharging moves through the electrode and comes into contact with the complex oxide of the negative electrode. Upon contact with the complex oxide, the oxygen gas is ionized and brought into the oxygen defects in the complex oxide, thus penetrating into the surface portion or the interior of the complex oxide.

Since the excess of oxygen gas produced during overcharging is absorbed or adsorbed by the complex oxide of the hydrogen absorbing alloy electrode in this way, this phenomenon prevents the rise in the internal pressure of the cell and inhibits the oxidation of the hydrogen absorbing alloy powder in the alloy electrode during overcharging, affording improved charge-discharge cycle characteristics.

It is thought that hydrogen atoms appearing on the surface of the hydrogen absorbing alloy powder are rapidly oxidized with oxygen atoms released from the complex oxide, consequently accelerating the electrode reaction during high-rate discharge to give improved high-rate discharge characteristics.

DESCRIPTION OF THE PREFERRED EMBODIMENTS

Although the hydrogen absorbing alloy powder is not limited specifically in composition, examples of hydrogen absorbing alloy materials suitable for use in the present invention are a hydrogen absorbing alloy material having a crystal structure of the $CaCu_5$ type and represented by $MmNi_xCo_yM_z$ (wherein Mm is a misch metal, M is at least one element selected from the group consisting of Al, Mg, Mn, Fe, Sn, Si, W, Zn, Cr and Cu, $2.8 \leq x \leq 4.4$, $0 \leq y \leq 0.6$, $0 \leq z \leq 1.5$ and $4.5 \leq x+y+z \leq 5.6$), and a hydrogen absorbing alloy material having an alloy layer substantially belonging to the Laves phase of an intermetallic compound and a C15-type crystal structure of a cubic system and represented by $AB_2$ (wherein A is at least one element selected from the group consisting of Ti, Zr, Hf, Y, Ca, Mg, La, Ce, Pr, Nd, Nb and Mo, and B is at least one element selected from the group consisting of V, Cr, Mn, Fe, Co, Ni, Cu, Zn and Al).

Mm in the hydrogen absorbing alloy mentioned above is important to make the alloy less costly and improved in durability.

Ni forms a crystal structure of the CaCu5 type with Mm and is important because this metal functions to form an alloy crystal lattice serving to absorb and desorb hydrogen in conditions under which the cell is used.

Co affords improved durability during charge-discharge cycles, Al provides improved durability in alkali electrolytes, and Mn acts to increase the amount of hydrogen to be absorbed and desorbed. These elements are therefore important.

It is desired that the hydrogen absorbing alloy powder be at least 1 $\mu$m to not greater than 100 $\mu$m in mean particle size.

The complex oxide powder comprises an oxygen ion conductor having many oxygen defects in structure. This type of complex oxide material can be at least one of a $ZrO_2$—$Y_2O_3$ solid solution, $ZrO_2$—$CaO$ solid solution, $CeO_2$—$Gd_2O_3$ solid solution, $CeO_2$—$La_2O_3$ solid solution, $ThO_2$—$Y_2O_3$ solid solution, $Bi_2O_3$—$Y_2O_3$ solid solution, $Bi_2O_3$—$Gd_2O_3$ solid solution, $Bi_2O_3$—$Nb_2O_3$ solid solution and $Bi_2O_3$—$WO_3$ solid solution.

The complex oxide can be produced by preparing a solid solution from two kinds of metallic oxides, for example, by the solid phase process. It is desirable to mix these metallic oxides together in such a weight ratio (mole ratio) that a solid phase can be formed as shown in Table 1 in order to cause many oxygen defects to be present in the resulting complex oxide, whereas even if the metallic oxides are mixed together in a weight ratio exceeding the limit of solid solution, a solid phase is present in the resulting complex oxide to produce an enhanced gas absorbing effect and an increased effect to promote the electrode reaction.

TABLE 1

| $MO_2$-M'O or $MO_2$-M'$_2O_3$ | mole ratio M'/(M + M') | $Bi_2O_3$-M'$_2O_3$ or $Bi_2O_3$-M'$O_3$ | mole ratio M'/(Bi + M') |
|---|---|---|---|
| $ZrO_2$-$Y_2O_3$ | 0.1 | $Bi_2O_3$-$Y_2O_3$ | 0.25 |
| $ZrO_2$-CaO | 0.15 | $Bi_2O_3$-$Gd_2O_3$ | 0.30 |
| $CeO_2$-$Gd_2O_3$ | 0.2 | $Bi_2O_3$-$Nb_2O_3$ | 0.15 |
| $CeO_2$-$La_2O_3$ | 0.2 | $Bi_2O_3$-$WO_3$ | 0.22 |
| $ThO_2$-$Y_2O_3$ | 0.2 | | |

It is desired to mix 0.1 to 10 wt. % of the complex oxide powder with the hydrogen absorbing alloy powder based on the combined amount of the two powders. Use of less than 0.1 wt. % of the complex oxide fails to fully obtain the gas absorbing effect, and the electrode reaction promoting effect during high-rate discharge. Presence of more than 10 wt. % of the complex oxide reduces the absolute amount of the hydrogen absorbing alloy in the electrode to result in a seriously impaired discharge capacity.

Preferably, the complex oxide powder is at least 0.1 μm to not greater than 10 μm in mean particle size.

The hydrogen absorbing alloy electrode can be produced by mixing the hydrogen absorbing alloy powder and the complex oxide powder in respective specified amounts as weighed out, along with a thickener, such as an aqueous solution of polyethylene oxide, and coating a current collector of Ni net or punched metal sheet with the mixture.

A spiral electrode unit can be prepared by winding the hydrogen absorbing alloy electrode into a roll together with a known sintered Ni electrode and an alkali-resistant separator of nonwoven fabric. A nickel-hydrogen cell can be fabricated by inserting the electrode unit into a cell can and placing an aqueous alkali solution obtained by dissolving lithium hydroxide solution in an aqueous solution of potassium hydroxide into the can.

The hydrogen absorbing alloy electrode may have incorporated therein a powder of electrically conductive agent, such as Ni, to give improved conductivity in addition to the hydrogen absorbing alloy powder and the complex oxide powder.

PTFE or like binder may be used in place of the thickener.

EXAMPLE 1

Complex oxide powders were prepared by the solid phase process to be described below.

To obtain each powder the corresponding metallic oxide powders listed in Table 1 given above were mixed together in the mole ratio listed, shaped into pellets and thereafter sintered in air at 800 to 1500° C. The sintered body obtained was pulverized, shaped into pellets again and thereafter sintered under the same conditions as above to obtain a complex oxide having a uniform solid phase.

The complex oxide obtained was pulverized in an agate mortar and a planetary ball mill made of agate and screened with a sieve having openings of 25 μm to obtain a powder, 5 μm in mean particle size.

When the complex oxides represented by $MO_2$-M'O or $MO_2$-M'$_2O_3$ in Table 1 were checked by powder X-ray diffractiometry for identification, they were found to be solid solutions having a cubic $CaF_2$ structure termed the fluorite structure.

Further when the complex oxides represented by $Bi_2O_3$-M'$_2O_3$ or $Bi_2O_3$-M'$O_3$ in Table 1 were checked similarly by powder X-ray diffractiometry for identification, they were found to be solid solutions in the form of the alpha phase (monoclinic system) of $Bi_2O_3$ as stabilized at a low temperature.

The hydrogen absorbing alloy powder was prepared by mixing together materials so as to obtain a composition (in atomic ratio) of $MmNi_{3.2}Co_{1.0}Mn_{0.6}Al_{0.2}$, melting the mixture in an arc melting furnace, making the molten mixture into an alloy by casting, pulverizing the resulting ingot, followed by screening to adjust the powder to a mean particle size of 40 μm.

A hydrogen absorbing alloy electrode was prepared by weighing out amounts of the resulting hydrogen absorbing alloy powder and a complex oxide powder in the ratio of 95 wt. %:5 wt. %, adding a 5% aqueous solution of polyethylene oxide serving as a thickener to 800 g of a metal powder obtained by mixing the hydrogen absorbing alloy power with a conductive agent, further adding the complex oxide powder to the mixture, kneading the resulting mixture into a pasty slurry, and applying the slurry to opposite surfaces of a punched metal sheet having a thickness of 0.08 mm and plated with Ni.

A spiral electrode unit was prepared by rolling the electrode thus obtained by a hydraulic press, winding the rolled electrode and a known sintered nickel electrode into a roll with an alkali-resistant separator of nonwoven fabric interposed between the electrodes. The electrode unit obtained was inserted into a cell can, and a 30 wt. % aqueous solution of potassium hydroxide was placed into the can. Specimen cells No. 1 to No. 9 were fabricated by the procedure described and by repeating this procedure with use of other complex oxide powders.

For comparison, specimen cells No. 10 to No. 13 were fabricated in which the negative electrode was a hydrogen absorbing alloy electrode having incorporated therein a powder of metallic oxide, i.e., $ZrO_2$, $CeO_2$, $ThO_2$ or $Bi_2O_3$, in place of the complex oxide powder.

Further fabricated were specimen cells No. 14 and No. 15 in which the negative electrode had incorporated therein a metallic oxide powder used in place of the complex oxide powder and prepared by merely mixing together $ZrO_2$ and CaO, or $Bi_2O_3$ and $Gd_2O_3$. The mixing ratio of CaO to $ZrO_2$ was 0.15 in terms of Ca/(Ca+Zr) in mole ratio, and the mixing ratio of $Gd_2O_3$ to $Bi_2O_3$ was 0.30 in terms of Gd/(Bi+Gd) in mole ratio.

Also fabricated was specimen cell No. 16 wherein the negative electrode was a hydrogen absorbing alloy electrode free from any complex oxide powder or metallic oxide powder.

Specimen cells No. 1 to No. 16 were subjected to a high-rate discharge test and a charge-discharge cycle test under the following conditions.

High-Rate Discharge Test

Each specimen cell was charged at 1000 mA for 1.2 hours and then discharged at 1000 mA to measure the discharge capacity (1C discharge capacity) when the discharge voltage reduced to 1.0 V (cutoff voltage). The cell was thereafter charged again at 1000 mA for 1.2 hours and discharged at 4000 mA to measure the discharge capacity (4C discharge capacity) at a cutoff voltage of 1.0 V. The ratio of the measurements, i.e., of the 4C discharge capacity to the 1C discharge capacity, was calculated as a "discharge capacity ratio" for evaluation as an index of the high-rate discharge characteristics.

Charge-Discharge Cycle Test

The specimen cell was charged at 1000 mA for 1.2 hours and discharged at 1000 mA (cutoff voltage 1.0 V) in repetition for a charge-discharge cycle test. The number of cycles was measured when the discharge capacity resulting from discharge at 1000 mA dropped below 500 mAh as an index of the charge-discharge cycle characteristics (corrosion resistance).

Table 2 shows the results of the high-rate discharge test and the charge-discharge cycle test.

TABLE 2

| No. | Oxide powder added | kind | Discharge Capacity Ratio (4C/1C) | Number of charge-discharge cycles | Remarks |
| --- | --- | --- | --- | --- | --- |
| 1 | $ZrO_2$-$Y_2O_3$ | Complex oxide powder | 0.93 | 888 | Invention |
| 2 | $ZrO_2$-CaO | Complex oxide powder | 0.91 | 865 | Invention |
| 3 | $CeO_2$-$Gd_2O_3$ | Complex oxide powder | 0.91 | 893 | Invention |
| 4 | $CeO_2$-$La_2O_3$ | Complex oxide powder | 0.92 | 870 | Invention |
| 5 | $ThO_2$-$Y_2O_3$ | Complex oxide powder | 0.81 | 825 | Invention |
| 6 | $Bi_2O_3$-$Y_2O_3$ | Complex oxide powder | 0.90 | 882 | Invention |
| 7 | $Bi_2O_3$-$Gd_2O_3$ | Complex oxide powder | 0.86 | 850 | Invention |
| 8 | $Bi_2O_3$-$Nb_2O_3$ | Complex oxide powder | 0.87 | 828 | Invention |
| 9 | $Bi_2O_2$-$WO_3$ | Complex oxide powder | 0.89 | 871 | Invention |
| 10 | $ZrO_2$ | Metallic oxide powder | 0.80 | 785 | Comp. Ex. |
| 11 | $CeO_2$ | Metallic oxide powder | 0.77 | 803 | Comp. Ex. |
| 12 | $ThO_2$ | Metallic oxide powder | 0.72 | 721 | Comp. Ex. |
| 13 | $Bi_2O_3$ | Metallic oxide powder | 0.78 | 759 | Comp. Ex. |
| 14 | $ZrO_2$ and CaO | Metallic oxide powder mixture | 0.80 | 793 | Comp. Ex. |
| 15 | $Bi_2O_3$ and $Gd_2O_3$ | | 0.79 | 762 | Comp. Ex. |
| 16 | None | — | 0.69 | 620 | Comp. Ex. |

When compared with the comparative examples, the specimen cells of the invention wherein the hydrogen absorbing alloy electrode contains a complex oxide powder are superior to the comparative specimen cells in both the discharge capacity ratio and the charge-discharge cycle characteristics. This appears attributable to the presence of the complex oxide powder by which the oxygen gas evolved from the positive electrode during overcharging is brought into the lattice detects of the complex oxide powder to result in an accelerated reaction to consume the oxygen gas.

With respect to the comparative examples, specimen cells No. 10 to No. 13 wherein a metallic oxide powder is used, and specimen cells No. 14 and No. 15 wherein a mere mixture of two kinds of metallic oxide powers is used exhibit a higher discharge capacity ratio and higher charge-discharge cycle characteristics than specimen cell No. 16. This indicates that the presence of the metallic oxide powder or the mixture of such powders gives the hydrogen absorbing alloy electrode an improved oxygen gas absorbing capacity. However, the comparative cells are inferior to the cells of the invention since the metallic oxide powder has no lattice defects unlike the complex oxide powder.

The cells of the invention are superior to those of the comparative examples because the complex oxide powder incorporated in the hydrogen absorbing alloy electrode is a substance known as an oxide ion conductor and has numerous oxygen defects in its crystal structure. It is thought that these oxygen defects give rise to the reaction represented by Equation 1 given below at the interface with the electrolyte during overcharging, consequently consuming an excess of oxygen gas evolved by the positive electrode.

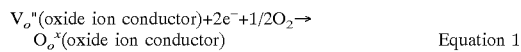

$V_o''$(oxide ion conductor)+$2e^-$+$1/2O_2$→
$O_o^x$(oxide ion conductor)     Equation 1

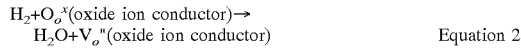

$H_2$+$O_o^x$(oxide ion conductor)→
$H_2O$+$V_o''$(oxide ion conductor)     Equation 2

(In the above equations, $V_o$ represents a void point of oxygen, and the superscript " represents relative presence of a charge of +2 since the charge at a position where a charge of −2 should originally be present is reduced to zero. The superscript x represents an oxide ion conductor having no relative charge.)

It appears that during discharge, hydrogen atoms appearing on the surface of the hydrogen absorbing alloy electrode are rapidly oxidized with oxygen atoms in the surface portion or interior of the complex oxide powder present in the vicinity thereof and serving as an oxide ion conductor as represented by Equation 2, therefore increasing the electrode reaction velocity during high-rate discharge and consequently giving a high discharge capacity ratio.

EXAMPLE 2

Hydrogen absorbing alloy electrodes were prepared in the same manner as the hydrogen absorbing alloy electrode of speciment cell No. 1 (of the invention) except that the complex oxide powder to be mixed with the hydrogen absorbing alloy powder was used in amounts varying from 0 to 10 wt. %. Nickel-hydrogen cells were assembled using the alloy electrodes as negative electrodes and subjected to a high-rate discharge test and charge-discharge cycle test by the same methods as in Example 1.

Since the cells were fabricated in the same manner as in Example 1 with the exception of using varying amounts of the complex oxide powder, the procedure will not be described repeatedly.

Table 3 shows the amounts of complex oxide powder added and the test results.

TABLE 3

| No. | Amount of complex oxide added (wt. %) | Discharge capacity ratio (4C/1C) | Number of charge-discharge cycles | Remarks |
| --- | --- | --- | --- | --- |
| 21 | 0.05 | 0.81 | 820 | Invention |
| 22 | 0.1 | 0.85 | 850 | Invention |
| 23 | 1 | 0.91 | 876 | Invention |
| 24 | 5 | 0.93 | 888 | Invention |
| 25 | 10 | 0.92 | 879 | Invention |
| 26 | 15 | 0.82 | 865 | Invention |
| 27 | 0 (None) | 0.69 | 620 | Comp. Ex. |

Table 3 reveals that specimen cells No. 21 to No. 26 wherein the complex oxide powder is used are greatly improved over specimen cells No. 27 incorporating no complex oxide in discharge capacity ratio and in the number of charge-discharge cycles.

A comparison between the cells of the invention indicates that the use of the complex oxide in an amount of at least 0.1 wt. % to not greater than 10 wt. % results in especially great values as to the discharge capacity ratio and the number of charge-discharge cycles. This means that if less than 0.1 wt. % of the complex oxide is used, the effective amount contributing to the gas absorbing reaction is insufficient, failing to fully produce the gas absorbing effect, and the electrode reaction promoting effect during high-rate discharge. Conversely if more than 10 wt. % of the complex oxide is used, the absolute amount of the hydrogen absorbing alloy in the electrode is lesser to result in an impaired discharge capacity and lower the high-rate discharge characteristics and charge-discharge cycle characteristics.

It is therefore desired to add at least 0.1 wt. % to not greater than 10 wt. % of the complex oxide based on the combined amount of the hydrogen absorbing alloy powder and the complex oxide.

The present invention can of course be modified or altered by one skilled in the art without departing from the spirit of the invention. Such modifications or alterations are included in the scope of the invention as defined in the appended claims.

What is claimed is:

1. A hydrogen absorbing alloy electrode containing a powder prepared by mixing a hydrogen absorbing alloy powder with a powder of at least one complex oxide selected from the group consisting of $ZrO_2$—$Y_2O_3$ solid solution, $ZrO_2$—$CaO$ solid solution, $ThO_2$—$Y_2O_3$ solid solution, $Bi_2O_3$—$Y_2O_3$ solid solution, $Bi_2O_3$—$Gd_2O_3$ solid solution, $Bi_2O_3$—$Nb_2O_3$ solid solution and $Bi_2O_3$—$WO_3$ solid solution.

2. The hydrogen absorbing alloy electrode according to claim 1 which contains 0.1 to 10 wt. % of the complex oxide powder based on the combined amount of the complex oxide powder and the hydrogen absorbing alloy powder.

3. The hydrogen absorbing alloy electrode according to claim 1 wherein the hydrogen absorbing alloy powder is 1 $\mu$m to 100 $\mu$m in mean particle size.

4. The hydrogen absorbing alloy electrode according to claim 1 wherein the hydrogen absorbing alloy powder is a hydrogen absorbing alloy material having a crystal structure of the CaCu5 type and represented by $MmNi_xCo_yM_z$ wherein Mm is a misch metal, M is at least one element selected from the group consisting of Al, Mg, Mn, Fe, Sn, Si, W, Zn, Cr and Cu, $2.8 \leq x \leq 4.4$, $0 \leq y \leq 0.6$, $0 \leq z \leq 1.5$ and $4.5 \leq x+y+z \leq 5.6$.

5. The hydrogen absorbing alloy electrode according to claim 1 wherein the hydrogen absorbing alloy powder is a hydrogen absorbing alloy material having an alloy layer substantially belonging to the Laves phase of an intermetallic compound and a C15-type crystal structure of a cubic system and represented by $AB_2$ wherein A is at least one element selected from the group consisting of Ti, Zr, Hf, Y, Ca, Mg, La, Ce, Pr, Nd, Nb and Mo, and B is at least one element selected from the group consisting of V, Cr, Mn, Fe, Co, Ni, Cu, Zn and Al.

6. A process for producing a hydrogen absorbing alloy electrode including the steps of:

weighing out specified amounts of a hydrogen absorbing alloy powder and a powder of at least one complex oxide selected from the group consisting of a $ZrO_2$—$Y_2O_3$ solid solution, $ZrO_2$—$CaO$ solid solution, $ThO_2$—$Y_2O_3$ solid solution, $Bi_2O$—$Y_2O_3$ solid solution, $Bi_2O_3$—$Gd_2O_3$ solid solution, $Bi_2O_3$—$Nb_2O_3$ solid solution and $Bi_2O_3$—$WO_3$ solid solution;

mixing the hydrogen absorbing alloy powder and the complex oxide powder along with a thickener to prepare a slurry; and coating a current collector with the resulting slurry.

7. The process for producing a hydrogen absorbing alloy electrode according to claim 6 wherein the complex oxide powder is used in an amount of 0.1 to 10 wt. % based on the combined amount of the complex oxide powder and the hydrogen absorbing alloy powder.

8. The process for producing a hydrogen absorbing alloy electrode according to claim 6 wherein the hydrogen absorbing alloy powder is 1 $\mu$m to 100 $\mu$m in mean particle size.

9. The process for producing a hydrogen absorbing alloy electrode according to claim 6 wherein the hydrogen absorbing alloy powder is a hydrogen absorbing alloy material having a crystal structure of the CaCu5 type and represented by $MmNi_xCo_yM_z$ wherein Mm is a misch metal, M is at least one element selected from the group consisting of Al, Mg, Mn, Fe, Sn, Si, W, Zn, Cr and Cu, $2.8 \leq x \leq 4.4$, $0 \leq y \leq 0.6$, $0 \leq z \leq 1.5$ and $4.5 \leq x+y+z \leq 5.6$.

10. The process for producing a hydrogen absorbing alloy electrode according to claim 6 wherein the hydrogen absorbing alloy powder is a hydrogen absorbing alloy material having an alloy layer substantially belonging to the Laves phase of an intermetallic compound and a C15-type crystal structure of a cubic system and represented by $AB_2$ wherein A is at least one element selected from the group consisting of Ti, Zr, Hf, Y, Ca, Mg, La, Ce, Pr, Nd, Nb and Mo, and B is at least one element selected from the group consisting of V, Cr, Mn, Fe, Co, Ni, Cu, Zn and Al.

* * * * *